US011669711B2

(12) United States Patent
Xie et al.

(10) Patent No.: US 11,669,711 B2
(45) Date of Patent: Jun. 6, 2023

(54) SYSTEM REINFORCEMENT LEARNING METHOD AND APPARATUS, AND COMPUTER STORAGE MEDIUM

(71) Applicant: SHANGHAI SENSETIME INTELLIGENT TECHNOLOGY CO., LTD., Shanghai (CN)

(72) Inventors: Shuqin Xie, Shanghai (CN); Zitian Chen, Shanghai (CN); Chao Xu, Shanghai (CN); Cewu Lu, Shanghai (CN)

(73) Assignee: SHANGHAI SENSETIME INTELLIGENT TECHNOLOGY CO., LTD, Shanghai (CN)

( * ) Notice: Subject to any disclaimer, the term of this patent is extended or adjusted under 35 U.S.C. 154(b) by 208 days.

(21) Appl. No.: 16/904,915

(22) Filed: Jun. 18, 2020

(65) Prior Publication Data

US 2020/0349431 A1 Nov. 5, 2020

Related U.S. Application Data

(63) Continuation of application No. PCT/CN2019/078520, filed on Mar. 18, 2019.

(30) Foreign Application Priority Data

May 7, 2018 (CN) ......................... 201810428099.3

(51) Int. Cl.
*G06N 3/006* (2023.01)
*G06N 3/08* (2023.01)
(Continued)

(52) U.S. Cl.
CPC ......... *G06N 3/006* (2013.01); *G06F 18/2155* (2023.01); *G06N 3/045* (2023.01); *G06N 3/08* (2013.01)

(58) Field of Classification Search
CPC ........ G06N 3/08; G06N 3/0454; G06N 20/20; G06V 10/82; G06V 10/7753; G06T 2207/20081
See application file for complete search history.

(56) References Cited

U.S. PATENT DOCUMENTS

| | | | | |
|---|---|---|---|---|
| 7,001,243 | B1 * | 2/2006 | Yi | B24B 37/013 451/41 |
| 11,287,634 | B2 * | 3/2022 | Yeh | G02B 21/365 |

(Continued)

FOREIGN PATENT DOCUMENTS

| | | | |
|---|---|---|---|
| CN | 103020602 | A | 4/2013 |
| CN | 105279555 | A | 1/2016 |

(Continued)

OTHER PUBLICATIONS

Computer English translation of Chinese Patent No. CN 106941602A, pp. 1-13. (Year: 2017).*

(Continued)

*Primary Examiner* — Daniel G Mariam
(74) *Attorney, Agent, or Firm* — Cooper Legal Group, LLC

(57) ABSTRACT

A system reinforcement learning method includes: processing an input image based on a first network of a system to obtain a first result; inputting the first result to a second network of the system to obtain a second result; and obtaining a reinforcement operation based on the second result by means of a reinforcement network, and adjusting the first result based on the reinforcement operation to obtain a target result. According to the embodiments of the present disclosure, information is fed back from downstream to upstream by means of the reinforcement network, and an output result of the system is optimized.

20 Claims, 5 Drawing Sheets

(51) Int. Cl.
*G06F 18/214* (2023.01)
*G06N 3/045* (2023.01)

(56) References Cited

U.S. PATENT DOCUMENTS

| | | | | |
|---|---|---|---|---|
| 2015/0333969 | A1 | 11/2015 | Vasseur et al. | |
| 2019/0205618 | A1* | 7/2019 | Jiang | G06T 11/00 |

FOREIGN PATENT DOCUMENTS

| | | | |
|---|---|---|---|
| CN | 106651774 | A | 5/2017 |
| CN | 106709565 | A | 5/2017 |
| CN | 106934346 | A | 7/2017 |
| CN | 106941602 | A | 7/2017 |
| CN | 107301383 | A | 10/2017 |
| CN | 107704857 | A | 2/2018 |
| CN | 108154222 | A | 6/2018 |
| CN | 108776834 | A | 11/2018 |
| JP | 2012108950 | A | 6/2012 |
| JP | 2016143351 | A | 8/2016 |

OTHER PUBLICATIONS

He, et al. (Neural Collaborative Filtering), pp. 1-10. (Year: 2017).*
Notice of Allowance of the Chinese application No. 201810428099.3, dated Jul. 6, 2021, 4 pgs.
International Search Report in the international application No. PCT/CN2019/078520, dated Jun. 17, 2019, 2 pgs.
"Environment Upgrade Reinforcement Learning for Non-differentiable Multi-stage Pipelines"; Jun. 2018; Shuqin Xie, Zitian Chen, Chao Xu and Cewu Lu, 2018 IEEE/CVF Conference on Computer Vision and Pattern Recognition, pp. 3810-3819.
English translation of the Written Opinion of the International Search Authority in the international application No. PCT/CN2019/078520, dated Jun. 17, 2019, 6 pgs.

* cited by examiner

SYSTEM REINFORCEMENT LEARNING METHOD AND APPARATUS, AND COMPUTER STORAGE MEDIUM

CROSS REFERENCE TO RELATED APPLICATIONS

This is a continuation of International Patent Application No. PCT/CN2019/078520, filed on Mar. 18, 2019, which claims priority to Chinese Patent Application No. 201810428099.3, filed on May 7, 2018. The disclosures of International Patent Application No. PCT/CN2019/078520 and Chinese Patent Application No. 201810428099.3 are hereby incorporated by reference in their entireties.

BACKGROUND

Currently, a multi-stage system achieves good effects, for example, on a multi-person pose detection task, an algorithm (an object detector+a single person pose detector) designed based on the multi-stage system achieves the best results on many databases. Moreover, an algorithm of a multi-stage structure also allows adjustment and replacement of different modules, and the model is flexible. Therefore, the present disclosure has a strong potential and a broad prospect.

SUMMARY

The present disclosure relates to computer vision technologies, and in particular, to a system reinforcement learning method and apparatus, an electronic device, and a computer storage medium.

Embodiments of the present disclosure provide a system reinforcement learning technology.

According to one aspect of the embodiments of the present disclosure, a system reinforcement learning method is provided, including: processing an input image based on a first network of a system to obtain a first result; inputting the first result into a second network of the system to obtain a second result; and obtaining a reinforcement operation based on the second result by using a reinforcement network, and adjusting the first result based on the reinforcement operation to obtain a target result.

According to another aspect of the embodiments of the present disclosure, a system reinforcement learning apparatus is provided, including: a first network module, configured to process an input image to obtain a first result; a second network module, configured to process the first result to obtain a second result; a reinforcement network module, configured to obtain a reinforcement operation based on the second result; and an executor, configured to adjust the first result based on the reinforcement operation and obtain a target result based on the adjusted first result.

According to another aspect of the embodiments of the present disclosure, an electronic device is provided, including: a memory configured to store executable instructions; and a processor, configured to communicate with the memory to execute the executable instructions so as to complete operations of the system reinforcement learning method as described above.

According to another aspect of the embodiments of the present disclosure, q computer storage medium provided is provided, configured to store computer readable instructions, where the instructions, when being executed, implement operations of the system reinforcement learning method as described above. The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
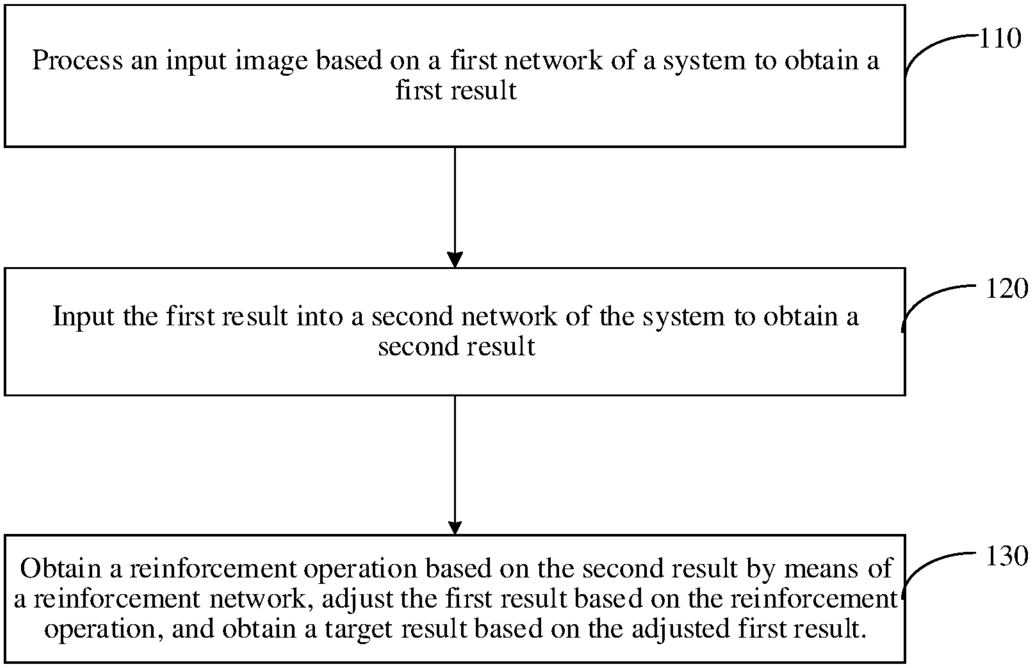
FIG. 1 is a schematic flowchart of a system reinforcement learning method provided by the embodiments of the present disclosure.

Various exemplary embodiments of the present disclosure are now described in detail with reference to the accompanying drawings. It should be noted that: unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person skilled in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed cloud computing environments, the program modules may be located in local or remote computing system storage media including storage devices.

A multi-stage system is often non-differentiable in connection among different stages, and thus the whole system cannot be jointly optimized, and cannot achieve the best effects. Non-differentiability represents that a gradient cannot be calculated. For example, for a system relating to a bounding box, when performing an operation of cropping an image in a bounding box, a gradient of the operation for coordinates of the bounding box cannot be calculated.

FIG. 1 is a schematic flowchart of a system reinforcement learning method provided by the embodiments of the present disclosure. As shown in FIG. 1, the method in this embodiment includes the following operations of blocks 110 to 130.

At block 110, an input image is processed based on a first network of a system to obtain a first result.

In some embodiments of the present disclosure, the first network of the system may be a neural network implementing a specific function or some network layers of a neural network, or may further include multiple neural networks. In some embodiments, the first network and a second network in the system have an association relationship, for example, the first network is a face detection network, and the second network is a face recognition network; in this case, the second network uses a detection result outputted by the first network as an input, and the second network obtains a recognition result based on an output of the first network. In general, the association between the first network and the second network only lies in a detection result of forward propagation, outputs between different stages have high correlation, and an incorrect detection result (an output of the first network) may cause an incorrect recognition result (an output of the second network).

For example, the first network may include, but not limited to, one or more of the following networks: a detection neural network, a recognition neural network, and a classification neural network; and the second network may include, but not limited to, one or more of the following networks: a detection neural network, a recognition neural network, and a classification neural network.

In an optional example, the operation of block 110 may be performed by a processor by invoking a corresponding instruction stored in a memory, and may also be performed by a first network module 41 run by the processor.

At block 120, the first result is inputted into the second network of the system to obtain a second result.

In an optional example, the operation of block 120 may be performed by a processor by invoking a corresponding instruction stored in a memory, and may also be performed by a second network module 42 run by the processor.

At block 130, a reinforcement operation is obtained based on the second result by using a reinforcement network, the first result is adjusted based on the reinforcement operation, and a target result is obtained based on the adjusted first result.

In order to obtain a better second result, in some embodiments, a reinforcement network is added in the system, the reinforcement network uses the second result outputted by the second network as an input, and adjusts the first result by using the outputted reinforcement operation. Information is fed back from downstream to upstream, and a target result is obtained by means of the information feedback.

In an optional example, the operation of block 130 may be performed by a processor by invoking a corresponding instruction stored in a memory, and may also be performed by a reinforcement network module 43 run by the processor.

Based on the system reinforcement learning method provided according to the embodiments of the present disclosure, an input image is processed based on a first network of a system to obtain a first result; the first result is inputted into a second network of the system to obtain a second result; a reinforcement operation is obtained based on the second result by means of a reinforcement network, and the first result is adjusted based on the reinforcement operation to obtain a target result. Information is fed back from downstream to upstream by means of the reinforcement network, and an output result of the system is optimized.

In one or more optional embodiments, the operation 130 may include the following operations.

The reinforcement operation is obtained by means of the reinforcement network based on the second result outputted by the second network, and the first result is adjusted based on the reinforcement operation to obtain a first intermediate result;

the first intermediate result is inputted into the second network, the second result is obtained based on the first intermediate result, and the second result is inputted into the reinforcement network; and the process above is performed in an iterative manner, and the second result is outputted as the target result in response to meeting a preset condition.

In some embodiments of the present disclosure, the preset condition may include that: the number of iteration adjustments reaches a preset number, or the effect of the second result meets an expectation, and the like. The embodiments of the present disclosure do not limit the specific form of the preset condition.

In some embodiments of the present disclosure, the reinforcement network obtains an adjustment action for the first result based on the second result. However, a good target result may not be obtained by a first intermediate result obtained after one or a few adjustment actions. Therefore, by means of iterative execution, the second result obtained from the previously adjusted first intermediate result is used as the input of the reinforcement network each time to obtain a new adjustment action, till the present condition is met.

In some embodiments of the present disclosure, the reinforcement operation may include at least one adjustment action, and the obtaining the reinforcement operation by means of the reinforcement network based on the second result outputted by the second network and adjusting the first result based on the reinforcement operation to obtain the first intermediate result includes the following operations.

An adjustment action probability is obtained based on the second result by means of the reinforcement network, and the at least one adjustment action is determined based on the adjustment action probability; and the first result is adjusted based on the at least one adjustment action to obtain the first intermediate result.

In some embodiments of the present disclosure, the reinforcement network may be a classification neural network, one or more adjustment actions having larger probability (for example, the maximum probability) are determined from multiple adjustment actions based on the second result, and the first result is adjusted. Optionally, in an example, an RGB image is inputted into the system, and a target result that is required to be outputted is an image recognition result (for example, semantic segmentation or a human body pose detection). A system processing process may include the following operations.

a. The first network is used for processing the inputted RGB image to obtain a first result Ω, where Ω is an abstract parameter, and for different recognition tasks, Ω may be different. In order to facilitate understanding, the following discussions for the example take a multi-stage multi-person pose prediction system as an example, a network at a first stage (corresponding to the first network) is an object detection network, and the outputted Ω is coordinates of a bounding box of an object.

b. The first result Ω is used as an input of the second network or an input of the second network is calculated according to the first result Ω, and the second result is outputted by means of the second network. In general, the input of the second network is related to the output of the first network. If Ω is the coordinates of a bounding box, the input of the second network is a portion of an original image in the bounding box. The output of the second network is the result of object recognition, for example, a heat map of the distribution of key points of the human body in the image.

c. The reinforcement network (for example, a classification network and an 18-layer ResNet (ResNet-18) are adopted for the reinforcement network) selects one action to adjust the first result Ω according to the output of the second network, returns to step b, and performs step c and step b in an iterative manner, till the preset condition is met. The preset condition can be set to be the number of iterations in this example, i.e., reaching a preset number of iterations, and the preset number of iterations is set according to needs (for example, the preset number of iterations is set to be 20). The reinforcement network uses the output of the second network as an input to generate a probability distribution for multiple actions, and selects at least one of the actions having a larger probability as a decision result; the multiple actions may include: that the output of the first network is the bounding box is taken as an example, an action set is a series of actions by which the bounding box can be adjusted, for example, multiple actions such as enlarging or reducing the height and/or width of the bounding box, pan-up, pan-down, pan-left, pan-right, and an unadjustment action.

In some embodiments of the present disclosure, the first result Ω is adjusted by using an executor according to the selected action, and the executor is a general term, because the reinforcement network only determines the serial number (a classification result of the classification network) of one action, and one function is required to convert the serial number to an action (for example, a specific action of adjusting the bounding box). One function can be used for direct implementation, and the function for implementation is called an executor.

In order to prevent the result outputted by the second network from a large deviation, the first result outputted by the first network is required to be used as a reference input of the reinforcement network. In some embodiments, the adjusting the first result by means of the reinforcement network based on the second result outputted by the second network to obtain the first intermediate result includes the following operations.

The adjustment action probability is obtained based on the second result and the first result by means of the reinforcement network, and the at least one adjustment action is determined based on the adjustment action probability; and In some embodiments of the present disclosure, a connection result can be obtained based on the second result and the first result, and the adjustment action probability is obtained based on the connection result by means of the reinforcement network, or when both the first result and the second result are images, the first result and the second result are cascaded based on an image channel, and the adjustment action probability is obtained based on the cascaded first result and second result. The embodiments of the present disclosure do not limit the specific association method between the first result and the second result, as long as the first result is referred to when obtaining the adjustment action probability.

The first result is adjusted based on the at least one adjustment action to obtain the first intermediate result.

In one or more optional embodiments, the method further includes: training a system based on a sample image, where the sample image comprises an annotated sample target result.

In order to achieve a better reinforcement learning effect, the adjustment action that is needed to adjust the first result is more accurate. Therefore, before the reinforcement learning, at least one network in the system may further be trained based on a sample image for which a sample target result is annotated; optionally, only the second network and the reinforcement network are trained, a more accurate adjustment action may be obtained by the trained reinforcement network, and a good target result may be obtained by the trained second network.

In some embodiments of the present disclosure, the training the system based on the sample image includes the following operations.

The sample image is processed based on the first network of the system to obtain a first sample result;

the first sample result is inputted into the second network of the system to obtain a second sample result;

a reinforcement operation is obtained based on the second sample result by means of the reinforcement network, the first sample result is adjusted based on the reinforcement operation, and a predicted target result is obtained based on the adjusted first sample result; and parameters of the second network and the reinforcement network are respectively adjusted based on the predicted target result and the annotated sample target result.

Figure 2:
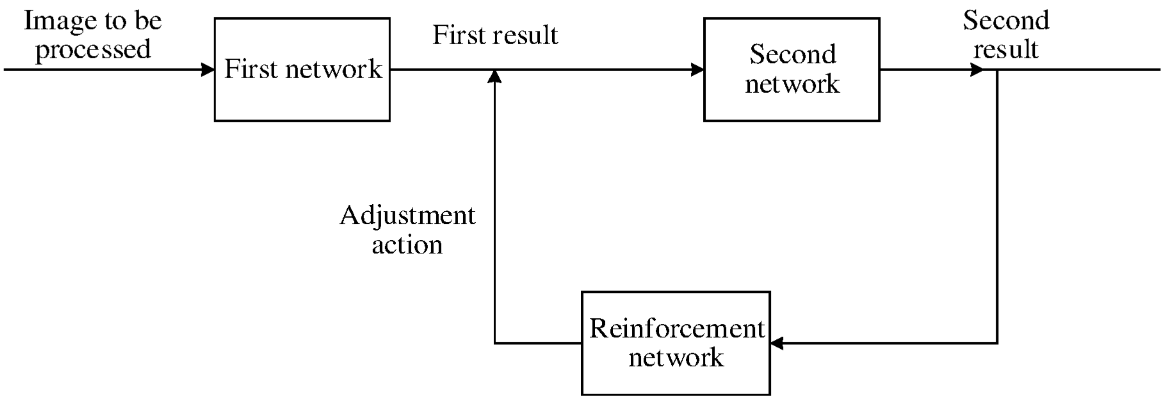
FIG. 2 is another schematic flowchart of a system reinforcement learning method provided by the embodiments of the present disclosure.

As an optional example, FIG. 2 is another schematic flowchart of a system reinforcement learning method provided by the embodiments of the present disclosure. As shown in FIG. 2, the second network and the reinforcement network use the results of each other as inputs of each other. Therefore, in a training process, the second network and the reinforcement network are required to be jointly trained; in the training process, as in a prediction process, the network included in the system needs to process a sample image to obtain a predicted target result, and adjusts parameters of the second network and the reinforcement network based on the predicted target result and the annotated sample target result. Optionally, the obtaining the reinforcement operation based on the second sample result by means of the reinforcement network, adjusting the first sample result based on the reinforcement operation, and obtaining the predicted target result based on the adjusted first sample result includes: obtaining the reinforcement operation based on the second sample result by means of the reinforcement network, and adjusting the first sample result based on the reinforcement operation to obtain a second intermediate sample result;

obtaining an intermediate predicted result by means of the second network based on the second intermediate sample result, and inputting the intermediate predicted result into the reinforcement network; and performing the process above in an iterative manner, and outputting the intermediate predicted result as the predicted target result in response to meeting the preset condition.

In some embodiments of the present disclosure, the preset condition may include that: the number of iterations reaches a preset number, or the effect of the second result meets an expectation, and the like. The embodiments of the present disclosure do not limit the specific form of the preset condition.

In the embodiments of the present disclosure, the reinforcement network and the second network are equally processed, and the parameters of the reinforcement network and the second network are respectively adjusted by using the finally outputted predicted target result and the annotated sample target result. However, the data volume required for reinforcement learning (the reinforcement network) is far more than that required for supervised learning, and a gradient variance of reinforcement learning is also far more than that of supervised learning (the second network). Therefore, if the reinforcement network and the second network are directly jointly trained, the network of supervised learning is greatly affected, and the accuracy rate is reduced. In order to solve this problem, the embodiments of the present disclosure provide a method for balancing different training requirements for reinforcement learning and supervised learning.

In some embodiments of the present disclosure, the adjusting the parameters of the reinforcement network based on the predicted target result and the annotated sample target result includes the following operations.

A first loss is determined based on the intermediate predicted result and the annotated sample target result; and the parameters of the reinforcement network are adjusted based on the at least one first loss.

In some embodiments of the present disclosure, in the training process, for an input, the reinforcement network continuously adjusts the first result, multiple adjustments correspond to multiple actions, and after iteration is completed, an action sequence (including multiple actions) is obtained. When adjusting the first sample result once, the second network generates a new corresponding predicted intermediate sample result (for example, a heat map). For the reinforcement network, according to the embodiments, the reinforcement network is trained by means of the predicted intermediate sample results of the whole action sequence; while for supervised learning of the second network, the second network may be trained by only the final predicted target result. Different training requirements for supervised learning and reinforcement learning can be balanced by means of different training actions.

In some embodiments of the present disclosure, the adjusting the parameters of the reinforcement network based on the at least one first loss includes the following operation.

The parameters of the reinforcement network are adjusted based on the at least one first loss according to an order in which the at least one first loss is obtained.

The loss can be determined based on the obtained intermediate predicted result and the annotated sample target result to obtain at least one loss, and the parameters of the reinforcement network are adjusted based on the obtained at least one loss.

In some embodiments of the present disclosure, the determining the first loss based on the intermediate predicted result and the annotated sample target result includes the following operations.

A current intermediate reward is determined based on the intermediate predicted result and the annotated sample target result;

a current predicted reward is determined based on the intermediate predicted result by means of a scoring network;

where the scoring network and the reinforcement network share part of the network structure; optionally, the scoring network only differs from the reinforcement network in respect of the last layer; the last layer of the reinforcement network is a fully connected layer, a one-dimensional characteristic vector is obtained, and the probability of selecting an action is determined based on the one-dimensional characteristic vector; the last layer of the scoring network is a fully connected layer, a characteristic value is obtained, and the characteristic value is a score.

A next intermediate predicted result is determined based on the intermediate predicted result by means of the reinforcement network and the second network; a next predicted reward is determined based on the next intermediate predicted result by means of the scoring network; and the first loss is determined based on the current intermediate reward, the current predicted reward, and the next predicted reward.

At least one first loss is obtained based on the intermediate predicted result, for example, each intermediate predicted result corresponds to one first loss.

Figure 3:
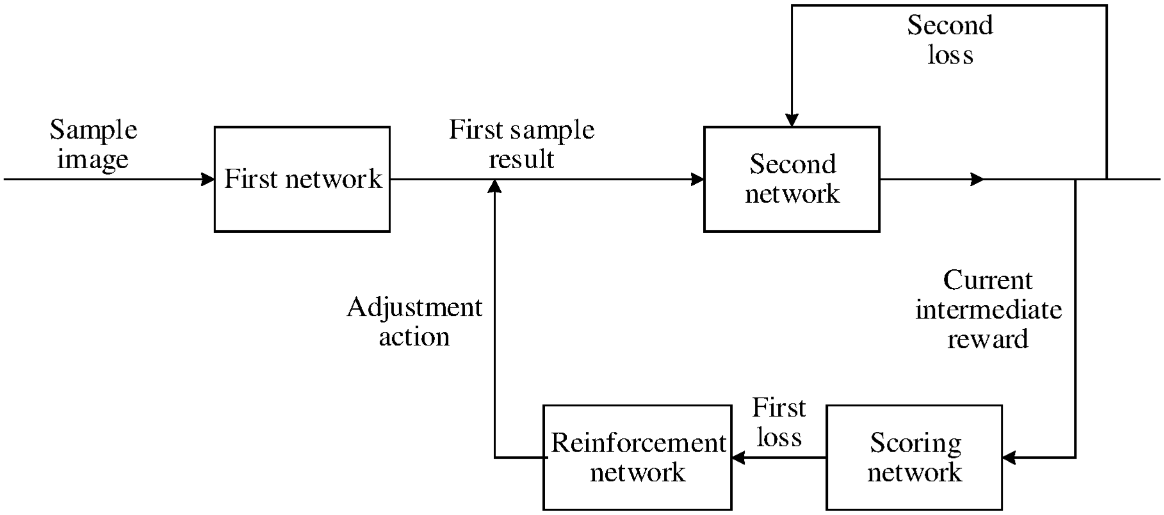
FIG. 3 is a diagram of a training example of a system reinforcement learning method provided by the embodiments of the present disclosure.

In this embodiment, FIG. 3 is a diagram of a training example of the system reinforcement learning method provided by the embodiments of the present disclosure. As shown in FIG. 3, a scoring network is added, a reinforcement learning agent model constituted by the reinforcement network and the scoring network adopts an Actor Critic algorithm (the reinforcement network is combined with the scoring network), and a learning method with different timing sequences (for example, TD-Learning) is used; where the Actor Critic method is a method combining Policy Gradient (Actor) and Function Approximation (Critic), the Actor achieves determining an action by the reinforcement network based on the probability, the Critic determines, based on the behavior of the Actor, the score of the action determined based on the probability, and the Actor amends the probability determining the action according to the score from the Critic; the advantages of the Actor Critic method are that single-step update can be performed and the method is quicker than a conventional method (updating at the end of a round). A TD-learning algorithm is also a known algorithm. There are probably two general ideas for a back-propagation algorithm of reinforcement learning. One is to execute the entire sequence completely in one time, then calculate the reward of the entire sequence, and then perform back optimization step by step to execute the back-propagation algorithm. The other one is to execute only one action each time, and then immediately perform optimization for one time. The ideas above are the ideas of the TD-learning algorithm. The advantages of the TD-learning algorithm are that a network converges faster, and the training time duration can be shortened without causing a great influence on the performance.

In some embodiments of the present disclosure, the determining the first loss based on the current intermediate reward, the current predicted reward, and the next predicted reward includes the following operation.

The first loss is obtained based on the current intermediate reward plus the next predicted reward minus the current predicted reward.

The variance of a loss function can be reduced by adding the current predicted reward and the next predicted reward to enable the training to be more stable.

In some embodiments of the present disclosure, the adjusting the parameters of the second network based on the predicted target result and the sample target result includes the following operation.

A second loss is determined based on the predicted target result and the sample target result, and the parameters of the second network are adjusted based on the second loss.

A person of ordinary skill in the art may understand that: all or some operations of implementing the forgoing embodiments of the method may be achieved by a program by instructing related hardware; the foregoing program may be stored in a computer-readable storage medium; when the program is executed, operations including the foregoing embodiments of the method are performed; moreover, the foregoing storage medium includes various media capable of storing program codes such as a Read-Only Memory (ROM), a Random Access Memory (RAM), a magnetic disk, or an optical disk.

Figure 4:
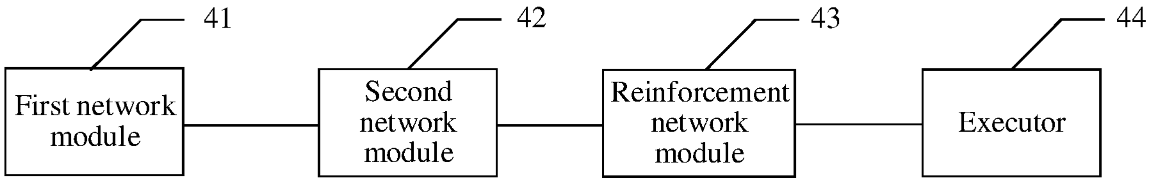
FIG. 4 is a schematic structural diagram of a system reinforcement learning apparatus provided by the embodiments of the present disclosure.

FIG. 4 is a schematic structural diagram of a system reinforcement learning apparatus provided by the embodiments of the present disclosure. The apparatus of this embodiment is configured to implement the foregoing method embodiments of the present disclosure. As shown in FIG. 4, the apparatus of this embodiment includes:

a first network module 41, configured to process an input image to obtain a first result;

a second network module 42, configured to process the first result to obtain a second result;

a reinforcement network module 43, configured to obtain a reinforcement action based on the second result; and an executor 44, configured to adjust the first result based on the reinforcement operation and obtain a target result based on the adjusted first result.

Based on the system reinforcement learning apparatus provided according to the embodiments of the present disclosure, an input image is processed based on a first network of a system to obtain a first result; the first result is inputted into a second network of the system to obtain a second result; and a reinforcement operation is obtained based on the second result by means of a reinforcement network, and the first result is adjusted based on the reinforcement operation to obtain a target result. Information is fed back from downstream to upstream by means of the reinforcement network, and the output result of the system is optimized.

In one or more optional embodiments, the reinforcement network module 43 includes:

an adjustment module, configured to adjust the first result based on the second result outputted by the second network module to obtain a first intermediate result; and a result output module, configured to input the first intermediate result into the second network module, obtain the second result based on the first intermediate result, input the second result into the adjustment module, and output the second result as the target result in response to meeting a preset condition.

In some embodiments of the present disclosure, the preset condition may include that: the number of adjustments reaches a preset number, or the effect of the second result meets an expectation, and the like. The embodiments of the present disclosure do not limit the specific form of the preset condition.

In some embodiments of the present disclosure, the reinforcement network obtains an adjustment action for the first result based on the second result. However, a good target result may not be obtained by a first intermediate result obtained after one or a few adjustment actions. Therefore, by means of iterative execution, the second result obtained from the previously adjusted first intermediate result is used as the input of the reinforcement network each time to obtain a new adjustment action, till the present condition is met.

In some embodiments of the present disclosure, the adjustment module is configured to: obtain an adjustment action probability based on the second result by means of the reinforcement network module and determine at least one adjustment action based on the adjustment action probability; and adjust the first result based on the at least one adjustment action to obtain the first intermediate result.

In some embodiments of the present disclosure, the reinforcement network module is configured to obtain the adjustment action probability based on the second result and the first result, and determine the at least one adjustment action based on the adjustment action probability; and the executor is configured to adjust the first result based on the at least one adjustment action to obtain the first intermediate result.

In some embodiments of the present disclosure, the reinforcement network module is configured to: obtain a connection result based on the second result and the first result; and obtain the adjustment action probability based on the connection result by means of the reinforcement network, and determine at least one adjustment action based on the adjustment action probability.

In one or more optional embodiments, the apparatus further includes: a training module, configured to train a system comprising the first network, the second network, and the reinforcement network based on a sample image.

The sample image comprises an annotated sample target result.

In order to achieve a better reinforcement learning effect, the adjustment action that is needed to adjust the first result is more accurate. Therefore, before the reinforcement learning, at least one network in the system may further be trained based on a sample image for which a sample target result has been annotated; optionally, only the second network and the reinforcement network are trained, a more accurate adjustment action may be obtained by the trained reinforcement network, and a good target result may be obtained by the trained second network.

In some embodiments of the present disclosure, the first network includes one or more of the following networks: a detection neural network, a recognition neural network, and a classification neural network; and the second network includes one or more of the following networks: a detection neural network, a recognition neural network, and a classification neural network.

In some embodiments of the present disclosure, the training module is configured to: input the sample image into the first network module, the second network module, the reinforcement network module, and the executor to obtain a predicted target result; and respectively adjust parameters of the second network and the reinforcement network based on the predicted target result and the annotated sample target result.

In some embodiments of the present disclosure, the reinforcement module is configured to obtain a reinforcement operation based on a second sample result obtained by the second network module;

the executor is configured to adjust a first sample result obtained by the first network module based on the reinforcement operation to obtain a second intermediate sample result; and the second network module is configured to obtain an intermediate predicted result based on the second intermediate sample result, input the intermediate predicted result into the reinforcement module, and output the intermediate predicted result as the predicted target result in response to meeting the preset condition.

In some embodiments of the present disclosure, the training module includes:

a first loss module, configured to determine the first loss based on the intermediate predicted result and the sample target result; and a first parameter adjustment module, configured to adjust the parameters of the reinforcement network based on the at least one first loss.

In some embodiments of the present disclosure, the first parameter adjustment module is configured to adjust the parameters of the reinforcement network based on the at least one first loss according to an order in which the at least one first loss is obtained.

In some embodiments of the present disclosure, the first loss module includes:

a reward determination module, configured to determine a current intermediate reward based on the intermediate predicted result and the sample target result; determine a current predicted reward based on the intermediate predicted result by means of a scoring network, where the scoring network and the reinforcement network share part of the network structure; determine a next intermediate predicted result based on the intermediate predicted result by means of the reinforcement network and the second network; and determine a next predicted reward based on the next intermediate predicted result by means of the scoring network; and a loss determination module, configured to determine the first loss based on the current intermediate reward, the current predicted reward, and the next predicted reward.

In some embodiments of the present disclosure, the loss determination module is configured to obtain the first loss based on the current intermediate reward plus the next predicted reward minus the current predicted reward.

In some embodiments of the present disclosure, a second network adjustment module is configured to determine a second loss based on the predicted target result and the sample target result, and adjust the parameters of the second network based on the second loss.

According to another aspect of the embodiments of the present disclosure, an electronic device is provided, including a memory configured to store executable instructions; and a processor, configured to communicate with the memory to execute the executable instructions so as to complete the system reinforcement learning method according to any one of the foregoing embodiments of the present disclosure.

According to another aspect of the embodiments of the present disclosure, a computer storage medium is provided, configured to store computer readable instructions, where when the instructions are executed by a processor, the processor implements the system reinforcement learning method provided in any one of the foregoing embodiments the present disclosure.

A computer program product provided according to another aspect of the embodiments of the present disclosure includes a computer readable code, where when the computer readable code runs in a device, a processor in the device executes operations of the system reinforcement learning method provided in any one of the foregoing embodiments the present disclosure.

Another computer program product provided according to yet another aspect of the embodiments of the present disclosure is configured to store computer readable instructions, where when the instructions are executed, a computer executes operations of the system reinforcement learning method provided in any one of the foregoing possible implementations.

In one or more optional embodiments, the embodiments of the present disclosure further provide a computer program product configured to store computer-readable instructions, where when the instructions are executed, a computer executes operations of the system reinforcement learning method in any one of the foregoing embodiments.

The computer program product is specifically implemented by means of hardware, software, or a combination thereof. In an optional example, the computer program product is specifically embodied as a computer storage medium. In another optional example, the computer program product is specifically embodied as a software product, such as Software Development Kit (SDK).

According to the embodiments of the present disclosure, further provided are another system reinforcement learning method and apparatus corresponding to same, an electronic device, a computer storage medium, and a computer program product, where the method includes: processing an input image based on a first network of a system to obtain a first result; inputting the first result into a second network of the system to obtain a second result; and adjusting the first result based on the second result by means of a reinforcement network to obtain a target result.

In some embodiments, a target tracking indication is specifically an invoking instruction. A first apparatus instructs, by means of invoking, a second apparatus to execute target tracking. Accordingly, in response to receiving the invoking instruction, the second apparatus executes the steps and/or process in any one of the embodiments of the foregoing target tracking method.

It should be understood that the terms such as "first" and "second" in the embodiments of the present disclosure are only used for distinguishing, and shall not be understood as limitations on the embodiments of the present disclosure.

It should also be understood that, in the present disclosure, "multiple" may refer to two or more, and "at least one" may refer to one, two or more.

It should also be understood that, for any component, data or structure mentioned in the present disclosure, if there is no explicit limitation or no opposite motivation is provided in context, it is generally understood that the number of the component, data or structure is one or more.

It should be further understood that the description of the embodiments of the present disclosure emphasizes differences between the embodiments, and the same or similar points therebetween may be used as reference and omitted for clarity.

Figure 5:
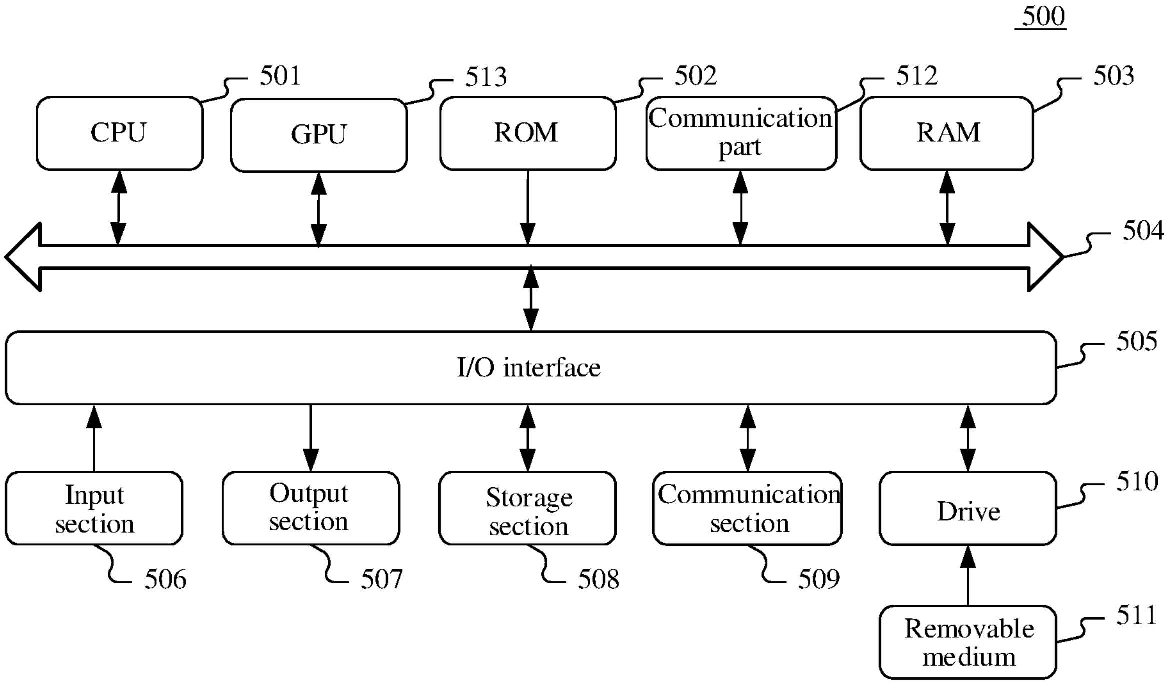
FIG. 5 is a schematic structural diagram of an electronic device, which may be a terminal device or a server, suitable for implementing the embodiments of the present disclosure.

The embodiments of the present disclosure further provide an electronic device which, for example, is a mobile terminal, a PC, a tablet computer, a server. Referring to FIG. 5 below, a schematic structural diagram of an electronic device 500, which is a terminal device or a server, suitable for implementing the embodiments of the present disclosure is shown. As shown in FIG. 5, the electronic device 500 includes one or more processors, a communication part, or the like. The one or more processors are, for example, one or more Central Processing Units (CPUs) 501 and/or one or more Graphic Processing Units (GPUs) 513, and may execute appropriate actions and processing according to executable instructions stored in an ROM 502 or executable instructions loaded from a storage section 508 to an RAM 503. The communication part 512 may include, but is not limited to, a network card. The network card may include, but is not limited to, an Infiniband (IB) network card.

The processor is communicated with the ROM 502 and/or the RAM 503 to execute the executable instructions, and is connected to the communication part 512 by means of a bus 504 and communicated with other target devices by means of the communication part 512, so as to complete the operations corresponding to any of the methods provided in the embodiments of the present disclosure, for example, processing an input image based on a first network of a system to obtain a first result; inputting the first result into a second network of the system to obtain a second result; and obtaining an the reinforcement operation based on the second result by means of a reinforcement network, and adjusting the first result based on the reinforcement operation to obtain a target result.

In addition, the RAM 503 further stores various programs and data required for operations of the apparatus. The CPU 501, the ROM 502, and the RAM 503 are connected to each other by means of the bus 504. In the presence of the RAM 503, the ROM 502 is an optional module. The RAM 503 stores executable instructions, or writes the executable instructions into the ROM 502 during running, where the executable instructions enable the CPU 501 to execute operations corresponding to the foregoing communication method. An Input/Output (I/O) interface 505 is also connected to the bus 504. The communication part 512 may be integrated, or may be configured to have a plurality of sub-modules (for example, a plurality of IB network cards) connected to the bus.

The following components are connected to the I/O interface 505: an input section 506 including a keyboard, a mouse, or the like; an output section 507 including a Cathode-Ray Tube (CRT), a Liquid Crystal Display (LCD), a speaker, or the like; a storage section 508 including a hard disk, or the like; and a communication section 509 of a network interface card including an LAN card, a modem, or the like. The communication section 509 performs communication processing by means of a network such as the Internet. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to requirements.

It should be noted that the architecture illustrated in FIG. 5 is merely an optional implementation mode. During specific practice, the number and types of the components in FIG. 5 may be selected, decreased, increased, or replaced according to actual requirements. Different functional components may be separated or integrated or the like. For example, the GPU 513 and the CPU 501 may be separated, or the GPU 513 may be integrated on the CPU 501, and the communication part may be separated from or integrated on the CPU 501 or the GPU 513 or the like. These alternative implementations all fall within the scope of protection of the present disclosure.

Particularly, a process described above with reference to a flowchart according to the embodiments of the present disclosure may be implemented as a computer software program. For example, the embodiments of the present disclosure include a computer program product, including a computer program tangibly included on a machine readable medium; the computer program includes a program code for executing the method shown in the flowchart; the program code may include corresponding instructions for executing operations of the method provided in the embodiments of the present disclosure, for example, processing an input image based on a first network of a system to obtain a first result; inputting the first result into a second network of the system to obtain a second result; and obtaining a reinforcement operation based on the second result by means of a reinforcement network, and adjusting the first result based on the reinforcement operation to obtain a target result. In such an embodiment, the computer program is downloaded and installed from the network by means of the communication section 509, and/or is installed from the removable medium 511. The computer program, when being executed by the CPU 501, executes the operations of the foregoing functions defined in the method of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses of the present disclosure are implemented in many manners. For example, the methods and apparatuses of the present disclosure are implemented by means of software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to enable a person of ordinary skill in the art to understand the present disclosure, so as to design various embodiments with various modifications applicable to particular use.

The invention claimed is:

1. A system reinforcement learning method, comprising:

processing an input image based on a first network of a system to obtain a first result;

inputting the first result into a second network of the system to obtain a second result; and obtaining a reinforcement operation based on the second result by using a reinforcement network, adjusting the first result based on the reinforcement operation by using the reinforcement network, and obtaining a target result by using the second network based on the adjusted first result, which comprises:

obtaining the reinforcement operation by using the reinforcement network based on the second result outputted by the second network, and adjusting the first result based on the reinforcement operation to obtain a first intermediate result;

inputting the first intermediate result into the second network, obtaining the second result based on the first intermediate result, and inputting the second result into the reinforcement network; and outputting the second result as the target result in response to a preset condition being met, wherein the reinforcement operation comprises at least one adjustment action; and the obtaining the reinforcement operation by using the reinforcement network based on the second result outputted by the second network, and adjusting the first result based on the reinforcement operation to obtain the first intermediate result comprises:

obtaining at least one adjustment action probability based on the second result by using the reinforcement network, and determining the at least one adjustment action based on the at least one adjustment action probability; and adjusting the first result based on the at least one adjustment action to obtain the first intermediate result.

2. The method according to claim 1, wherein the obtaining at least one adjustment action probability based on the second result by using the reinforcement network comprises:

obtaining the at least one adjustment action probability based on the second result and the first result by using the reinforcement network.

3. The method according to claim 2, wherein the obtaining the at least one adjustment action probability based on the second result and the first result by using the reinforcement network, and determining the at least one adjustment action based on the at least one adjustment action probability comprises:

obtaining a connection result based on the second result and the first result; and obtaining the at least one adjustment action probability based on the connection result by using the reinforcement network, and determining the at least one adjustment action based on the at least one adjustment action probability.

4. The method according to claim 1, further comprising: training the system based on a sample image, wherein the sample image comprises an annotated sample target result, wherein the training the system based on the sample image comprises:

processing the sample image by using the first network of the system to obtain a first sample result;

inputting the first sample result into the second network of the system to obtain a second sample result;

obtaining a second reinforcement operation based on the second sample result by using the reinforcement network, adjusting the first sample result based on the second reinforcement operation, and obtaining a predicted target result based on the adjusted first sample result; and respectively adjusting parameters of the second network and the reinforcement network based on the predicted target result and the annotated sample target result.

5. The method according to claim 4, wherein the obtaining the second reinforcement operation based on the second sample result by using the reinforcement network, adjusting the first sample result based on the second reinforcement operation, and obtaining the predicted target result based on the adjusted first sample result comprises:

obtaining the reinforcement operation based on the second sample result by means of the reinforcement network, and adjusting the first sample result based on the reinforcement operation to obtain a second intermediate sample result;

obtaining an intermediate predicted result by using the second network based on the second intermediate sample result, and inputting the intermediate predicted result into the reinforcement network; and outputting the intermediate predicted result as the predicted target result in response to a preset condition being met, wherein the adjusting the parameters of the reinforcement network based on the predicted target result and the annotated sample target result comprises:

determining a first loss based on the intermediate predicted result and the annotated sample target result; and adjusting the parameters of the reinforcement network based on the first loss.

6. The method according to claim 5, wherein the adjusting the parameters of the reinforcement network based on the first loss comprises:

adjusting the parameters of the reinforcement network based on the first loss according to an order in which the first loss is obtained.

7. The method according to claim 5, wherein the determining the first loss based on the intermediate predicted result and the annotated sample target result comprises:

determining a current intermediate reward based on the intermediate predicted result and the annotated sample target result;

determining a current predicted reward based on the intermediate predicted result by using a scoring network, wherein the scoring network and the reinforcement network are configured to share part of a network structure;

determining a next intermediate predicted result based on the intermediate predicted result by using the reinforcement network and the second network, and determining a next predicted reward based on the next intermediate predicted result by using the scoring network; and determining the first loss based on the current intermediate reward, the current predicted reward, and the next predicted reward.

8. A system reinforcement learning apparatus, comprising:

a processor; and a memory configured to store instructions executable by the processor, wherein the processor is configured to:

process an input image based on a first network to obtain a first result;

process the first result by inputting the first result into a second network to obtain a second result;

obtain a reinforcement operation based on the second result by using a reinforcement network; and adjust the first result based on the reinforcement operation by using the reinforcement network and obtain a target result by using the second network based on the adjusted first result, wherein the processor is further configured to:

adjust the first result based on the second result to obtain a first intermediate result;

input the first intermediate result to obtain the second result based on the first intermediate result, input the second result into the reinforcement network, and output the second result as the target result in response to a preset condition being met;

obtain at least one adjustment action probability based on the second result and determine at least one adjustment action based on the at least one adjustment action probability; and adjust the first result based on the at least one adjustment action to obtain the first intermediate result.

9. The apparatus according to claim 8, wherein the processor is configured to obtain the at least one adjustment action probability based on the second result and the first result.

10. The apparatus according to claim 9, wherein the processor is configured to:

obtain a connection result based on the second result and the first result; and obtain the at least one adjustment action probability based on the connection result by using the reinforcement network, and determine the at least one adjustment action based on the at least one adjustment action probability.

11. The apparatus according to claim 8, wherein the processor is further configured to:

train a system comprising the first network, the second network, and the reinforcement network based on a sample image, wherein the sample image comprises an annotated sample target result; and input the sample image to obtain a predicted target result; and respectively adjust parameters of the second network and the reinforcement network based on the predicted target result and the annotated sample target result.

12. The apparatus according to claim 11, wherein the processor is further configured to: input the sample image into the first network, the second network, and the reinforcement network to obtain the predicted target result; and respectively adjust the parameters of the second network and the reinforcement network based on the predicted target result and the annotated sample target result.

13. The apparatus according to claim 12, wherein the processor is configured to:

obtain a second reinforcement operation based on a second sample result;

adjust a first sample result based on the second reinforcement operation to obtain a second intermediate sample result;

obtain an intermediate predicted result based on the second intermediate sample result, input the intermediate predicted result into the reinforcement network of the system, and output the intermediate predicted result as the predicted target result in response to a preset condition being met, wherein the operation of adjusting the parameters of the reinforcement network based on the predicted target result and the annotated sample target result comprises:

determining a first loss based on the intermediate predicted result and the annotated sample target result; and adjusting the parameters of the reinforcement network based on the first loss.

14. The apparatus according to claim 13, wherein the processor is configured to adjust the parameters of the reinforcement network based on the first loss according to an order in which the first loss is obtained.

15. The apparatus according to claim 13, wherein the processor is configured to:

determine a current intermediate reward based on the intermediate predicted result and the annotated sample target result; determine a current predicted reward based on the intermediate predicted result by using a scoring network, wherein the scoring network and the reinforcement network are configured to share part of a network structure; determine a next intermediate predicted result based on the intermediate predicted result by using the reinforcement network and the second network; and determine a next predicted reward based on the next intermediate predicted result by means of the scoring network; and determine the first loss based on the current intermediate reward, the current predicted reward, and the next predicted reward.

16. A non-transitory computer storage medium, configured to store computer readable instructions, wherein the computer readable instructions, when being executed, implement a system reinforcement learning method, the method comprising:

processing an input image based on a first network of a system to obtain a first result;

inputting the first result into a second network of the system to obtain a second result; and obtaining a reinforcement operation based on the second result by using a reinforcement network, adjusting the first result based on the reinforcement operation by using the reinforcement network, and obtaining a target result by using the second network based on the adjusted first result, which comprises:

obtaining the reinforcement operation by using the reinforcement network based on the second result outputted by the second network, and adjusting the first result based on the reinforcement operation to obtain a first intermediate result;

inputting the first intermediate result into the second network, obtaining the second result based on the first intermediate result, and inputting the second result into the reinforcement network; and outputting the second result as the target result in response to a preset condition being met, wherein the reinforcement operation comprises at least one adjustment action; and the obtaining the reinforcement operation by using the reinforcement network based on the second result outputted by the second network, and adjusting the first result based on the reinforcement operation to obtain the first intermediate result comprises:

obtaining at least one adjustment action probability based on the second result by using the reinforcement network, and determining the at least one adjustment action based on the at least one adjustment action probability; and adjusting the first result based on the at least one adjustment action to obtain the first intermediate result.

17. The non-transitory computer storage medium of claim 16, wherein the obtaining at least one adjustment action probability based on the second result by using the reinforcement network comprises:

obtaining the at least one adjustment action probability based on the second result and the first result by using the reinforcement network.

18. The non-transitory computer storage medium of claim 17, wherein the obtaining the at least one adjustment action probability based on the second result and the first result by using the reinforcement network, and determining the at least one adjustment action based on the at least one adjustment action probability comprises:

obtaining a connection result based on the second result and the first result; and obtaining the at least one adjustment action probability based on the connection result by using the reinforcement network, and determining the at least one adjustment action based on the at least one adjustment action probability.

19. The non-transitory computer storage medium of claim 16, wherein the method further comprises: training the system based on a sample image, wherein the sample image comprises an annotated sample target result, wherein the training the system based on the sample image comprises:

processing the sample image by using the first network of the system to obtain a first sample result;

inputting the first sample result into the second network of the system to obtain a second sample result;

obtaining a second reinforcement operation based on the second sample result by using the reinforcement network, adjusting the first sample result based on the second reinforcement operation, and obtaining a predicted target result based on the adjusted first sample result; and respectively adjusting parameters of the second network and the reinforcement network based on the predicted target result and the annotated sample target result.

20. The non-transitory computer storage medium of claim 19, wherein the obtaining the second reinforcement operation based on the second sample result by using the reinforcement network, adjusting the first sample result based on the second reinforcement operation, and obtaining the predicted target result based on the adjusted first sample result comprises:

obtaining the reinforcement operation based on the second sample result by means of the reinforcement network, and adjusting the first sample result based on the reinforcement operation to obtain a second intermediate sample result;

obtaining an intermediate predicted result by using the second network based on the second intermediate sample result, and inputting the intermediate predicted result into the reinforcement network; and outputting the intermediate predicted result as the predicted target result in response to a preset condition being met, wherein the adjusting the parameters of the reinforcement network based on the predicted target result and the annotated sample target result comprises:

determining a first loss based on the intermediate predicted result and the annotated sample target result; and adjusting the parameters of the reinforcement network based on the first loss.

* * * * *